(12) United States Patent
Li et al.

(10) Patent No.: US 11,579,713 B1
(45) Date of Patent: Feb. 14, 2023

(54) MOUSE DEVICE

(71) Applicant: Primax Electronics Ltd., Taipei (TW)

(72) Inventors: Ya-Jun Li, Taipei (TW); Qing-Lin Zeng, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/483,607

(22) Filed: Sep. 23, 2021

(30) Foreign Application Priority Data

Jul. 26, 2021 (CN) .......................... 202110849121.3

(51) Int. Cl.
*G06F 3/0354* (2013.01)

(52) U.S. Cl.
CPC ................................ *G06F 3/03543* (2013.01)

(58) Field of Classification Search
CPC .................................................... G06F 3/03543
See application file for complete search history.

(56) References Cited

U.S. PATENT DOCUMENTS

| 5,268,674 A * | 12/1993 | Howard | G06F 3/03543 200/332 |
| 10,782,798 B1 * | 9/2020 | Ho | H05K 1/118 |
| 11,231,792 B1 * | 1/2022 | Huang | G06F 3/03543 |
| 2002/0167482 A1 * | 11/2002 | Yin | G06F 1/1616 345/156 |
| 2003/0179177 A1 * | 9/2003 | Wang | G06F 3/03543 345/156 |
| 2009/0310289 A1 * | 12/2009 | Hou | G06F 3/03543 361/679.02 |
| 2018/0113521 A1 * | 4/2018 | Lai | G06F 3/03543 |
| 2019/0146600 A1 * | 5/2019 | Tsai | G06F 3/0202 345/163 |
| 2020/0167011 A1 * | 5/2020 | Liu | G06F 3/0362 |

* cited by examiner

*Primary Examiner* — Ariel A Balaoing
(74) *Attorney, Agent, or Firm* — Kirton McConkie; Evan R. Witt

(57) ABSTRACT

A mouse device includes a middle frame, a switch, a button plate, a slidable element and an elastic element. The middle frame includes an opening part and a first hook. The first hook is located beside the opening part. The switch is fixed at a position under the middle frame. The switch includes a triggering part. The button plate is located over the middle frame. The button plate includes a pressing rod. The pressing rod is penetrated downwardly through the opening part. The pressing rod includes a receiving groove and a first sleeve. The receiving groove is located over the first sleeve. The first sleeve includes a perforation. The slidable element includes a second sleeve and a second hook. The second sleeve is installed within the first sleeve. The second hook is engaged with the perforation. The elastic element is disposed within the second sleeve.

13 Claims, 20 Drawing Sheets

US 11,579,713 B1

MOUSE DEVICE

FIELD OF THE INVENTION

The present invention relates to a mouse device, and more particularly to mouse device capable of providing a pre-pressing effect on a switch.

BACKGROUND OF THE INVENTION

Generally, during the operation of a mouse device, a left button plate or a right button plate is pressed down to a certain extent by the user, and then an underlying switch is triggered to generate a pressing signal. However, since the mouse device is produced by assembling many components and each component has production tolerance or assembling tolerance, an empty stroke problem or an excessive pre-pressing problem usually occurs.

When the empty stroke problem is generated, the left button plate or the right button plate is not continuously contacted with the switch. Consequently, during the pressing process, the left button plate (or the right button plate) and the switch readily collide with each other to generate noise. When the excessive pre-pressing problem is generated, the left button plate or the right button plate is continuously contacted with the switch. Since the switch is excessively pushed by the left button plate or the right button plate, the tactile feel of the user to press down the left button plate or the right button plate is adversely affected or even the unexpected pressing signal is generated by the switch.

Therefore, there is a need of providing an improved mouse device in order to overcome the drawbacks of the conventional technologies.

SUMMARY OF THE INVENTION

The present invention provides a mouse device with an improved structural design to overcome an empty stroke problem or an excessive pre-pressing problem. Since it is not necessary to largely change the specifications or structures of other cooperative components of the mouse device, the mass production cost of the mouse device is reduced.

In accordance with an aspect of the present invention, a mouse device is provided. The mouse device includes a middle frame, a switch, a button plate, a slidable element and an elastic element. The middle frame includes an opening part and a first hook. The first hook is located beside the opening part. The switch is fixed at a position under the middle frame. The switch includes a triggering part. The button plate is located over the middle frame. The button plate includes a pressing rod. The pressing rod is penetrated downwardly through the opening part of the middle frame. The pressing rod includes a receiving groove and a first sleeve. The receiving groove is located over the first sleeve. The first sleeve includes a perforation. The slidable element includes a second sleeve and a second hook. The second sleeve is installed within the first sleeve. The second hook is engaged with the perforation. The elastic element is disposed within the second sleeve. Consequently, the receiving groove is upwardly pushed against the first hook and the second sleeve is downwardly pushed against the triggering part of the switch.

In an embodiment, the slidable element is made of a material with high lubricity and high wear resistance.

In an embodiment, a material of the slidable element is selected from at least one of acrylonitrile butadiene styrene (ABS), polycarbonate (PC), polyoxymethylene (POM) and polytetrafluoroethylene (PTFE).

In an embodiment, the mouse device further includes a buffering pad, which is arranged between the second sleeve and the triggering part of the switch. A material of the buffering pad is selected from at least one of polytetrafluoroethylene (PTFE) and ultra-high molecular weight polyethylene (UPE).

In an embodiment, a protrusion edge structure is formed on a lateral wall of the second sleeve, and the protrusion edge structure is contacted with an inner wall of the first sleeve.

In an embodiment, the second sleeve and the first sleeve are contacted with each other in a line contact manner.

In an embodiment, a length of the perforation is larger than a length of the second hook.

In accordance with another aspect of the present invention, a mouse device is provided. The mouse device includes a middle frame, a switch, a button plate, a slidable element and an elastic element. The middle frame includes an opening part and a first hook. The first hook is located beside the opening part. The switch is fixed at a position under the middle frame. The switch includes a triggering part. The button plate is located over the middle frame. The button plate includes a pressing rod. The pressing rod is penetrated downwardly through the opening part of the middle frame. The pressing rod includes a first sleeve and a second hook. The first sleeve includes a perforation. The second hook is disposed on an external surface of the first sleeve. The slidable element includes a second sleeve and a third hook. The second sleeve is installed within the first sleeve. The third hook is engaged with the perforation. The elastic element is disposed within the second sleeve. Consequently, the second hook is upwardly pushed against the first hook and the second sleeve is downwardly pushed against the triggering part of the switch.

In an embodiment, the slidable element is made of a material with high lubricity and high wear resistance.

In an embodiment, a material of the slidable element is selected from at least one of acrylonitrile butadiene styrene (ABS), polycarbonate (PC), polyoxymethylene (POM) and polytetrafluoroethylene (PTFE).

In an embodiment, the mouse device further includes a buffering pad, which is arranged between the second sleeve and the triggering part of the switch. A material of the buffering pad is selected from at least one of polytetrafluoroethylene (PTFE) and ultra-high molecular weight polyethylene (UPE).

In an embodiment, a protrusion edge structure is formed on a lateral wall of the second sleeve, and the protrusion edge structure is contacted with an inner wall of the first sleeve.

In an embodiment, the second sleeve and the first sleeve are contacted with each other in a line contact manner.

In an embodiment, a length of the perforation is larger than a length of the third hook.

In accordance with another aspect of the present invention, a mouse device is provided. The mouse device includes a middle frame, a switch, a button plate, a slidable element and an elastic element. The middle frame includes an opening part and a first hook. The first hook is located beside the opening part. The switch is fixed at a position under the middle frame. The switch includes a triggering part. The button plate is located over the middle frame. The button plate includes a pressing rod. The pressing rod is penetrated downwardly through the opening part of the middle frame. The pressing rod includes a receiving groove and a first sleeve. The receiving groove is located over the first sleeve. The first sleeve includes a perforation. The slidable element includes a second sleeve and a second hook. The first sleeve is installed within the second sleeve. The second hook is engaged with the perforation. The elastic element is disposed within the first sleeve. Consequently, the receiving groove is upwardly pushed against the first hook, and the second sleeve is downwardly pushed against the triggering part of the switch.

In an embodiment, the slidable element is made of a material with high lubricity and high wear resistance.

In an embodiment, a material of the slidable element is selected from at least one of acrylonitrile butadiene styrene (ABS), polycarbonate (PC), polyoxymethylene (POM) and polytetrafluoroethylene (PTFE).

In an embodiment, the mouse device further includes a buffering pad, which is arranged between the second sleeve and the triggering part of the switch. A material of the buffering pad is selected from at least one of polytetrafluoroethylene (PTFE) and ultra-high molecular weight polyethylene (UPE).

In an embodiment, a protrusion edge structure is formed on a lateral wall of the first sleeve, and the protrusion edge structure is contacted with an inner wall of the second sleeve.

In an embodiment, the first sleeve and the second sleeve are contacted with each other in a line contact manner.

In accordance with another aspect of the present invention, a mouse device is provided. The mouse device includes a middle frame, a switch, a button plate, a slidable element and an elastic element. The middle frame includes an opening part and a first hook. The first hook is located beside the opening part. The switch is fixed at a position under the middle frame. The switch includes a triggering part. The button plate is located over the middle frame. The button plate includes a pressing rod. The pressing rod is penetrated downwardly through the opening part of the middle frame. The pressing rod includes a first sleeve and a second hook. The first sleeve includes a perforation. The second hook is disposed on an external surface of the first sleeve. The slidable element includes a second sleeve and a third hook. The first sleeve is installed within the second sleeve. The third hook is engaged with the perforation. The elastic element is disposed within the first sleeve. Consequently, the second hook is upwardly pushed against the first hook, and the second sleeve is downwardly pushed against the triggering part of the switch.

In an embodiment, the slidable element is made of a material with high lubricity and high wear resistance.

In an embodiment, a material of the slidable element is selected from at least one of acrylonitrile butadiene styrene (ABS), polycarbonate (PC), polyoxymethylene (POM) and polytetrafluoroethylene (PTFE).

In an embodiment, the mouse device further includes a buffering pad, which is arranged between the second sleeve and the triggering part of the switch. A material of the buffering pad is selected from at least one of polytetrafluoroethylene (PTFE) and ultra-high molecular weight polyethylene (UPE).

In an embodiment, a protrusion edge structure is formed on a lateral wall of the first sleeve, and the protrusion edge structure is contacted with an inner wall of the second sleeve.

In an embodiment, the first sleeve and the second sleeve are contacted with each other in a line contact manner.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 1:
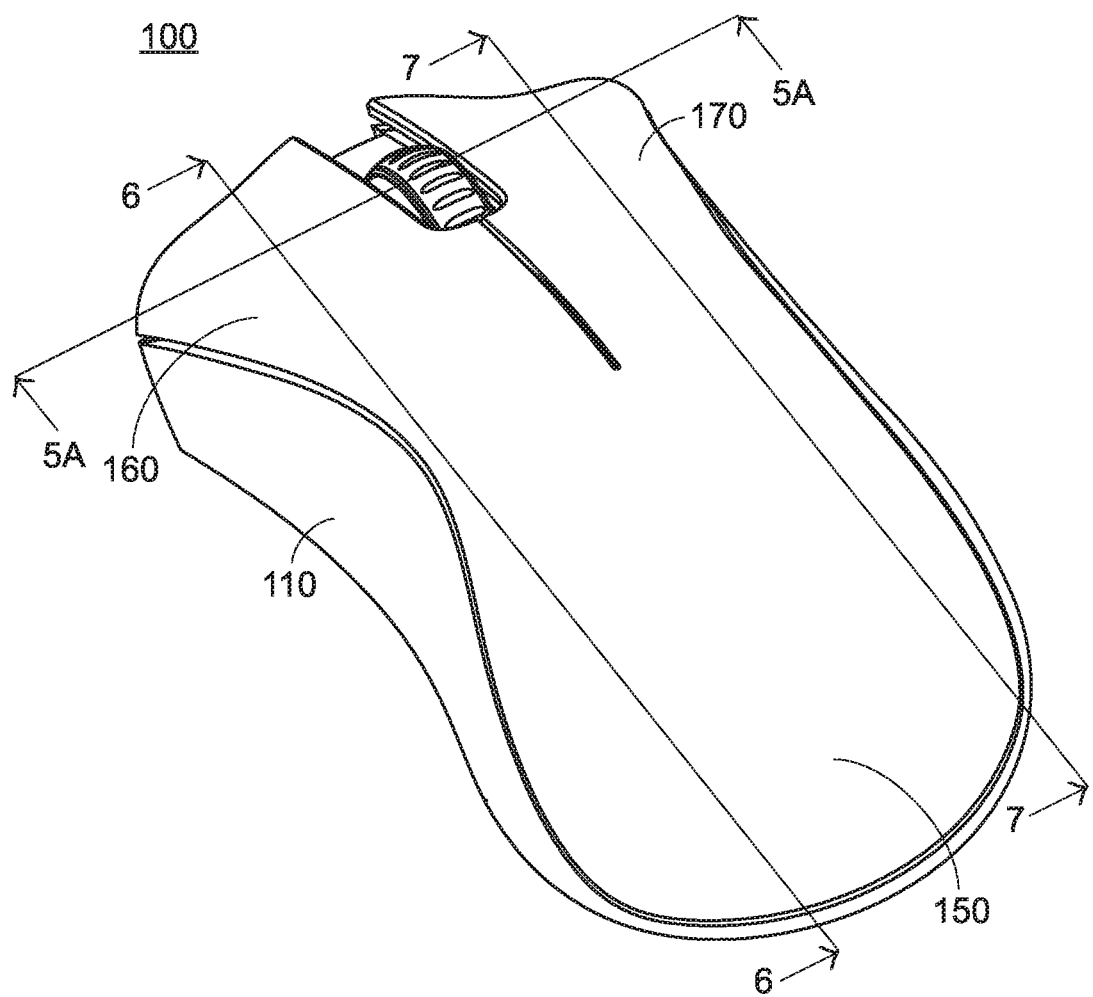
FIG. 1 is a schematic perspective view illustrating a mouse device according to a first embodiment of the present invention.
Figure 2:
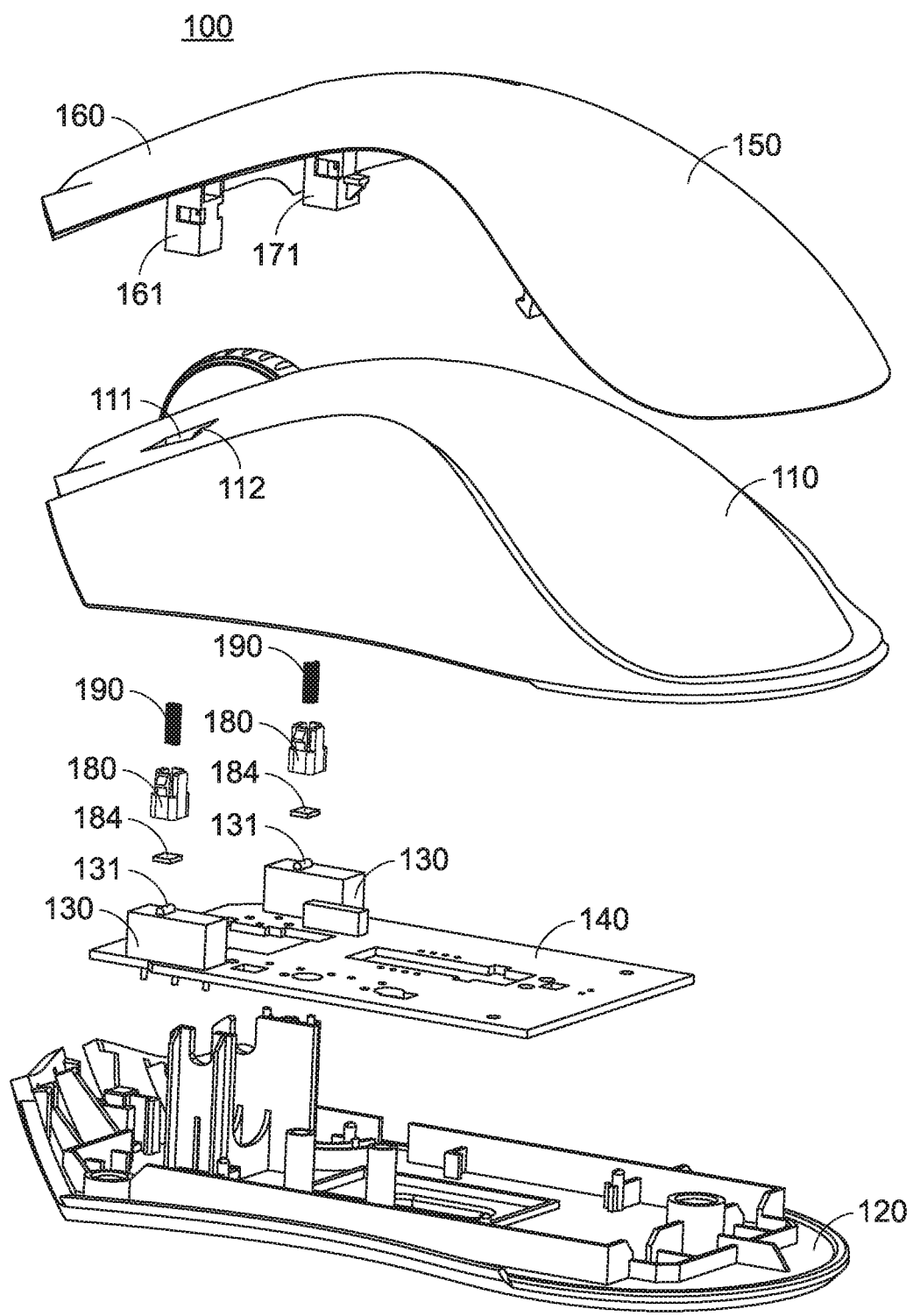
FIG. 2 is a schematic exploded view illustrating the mouse device as shown in FIG. 1.
Figure 3:
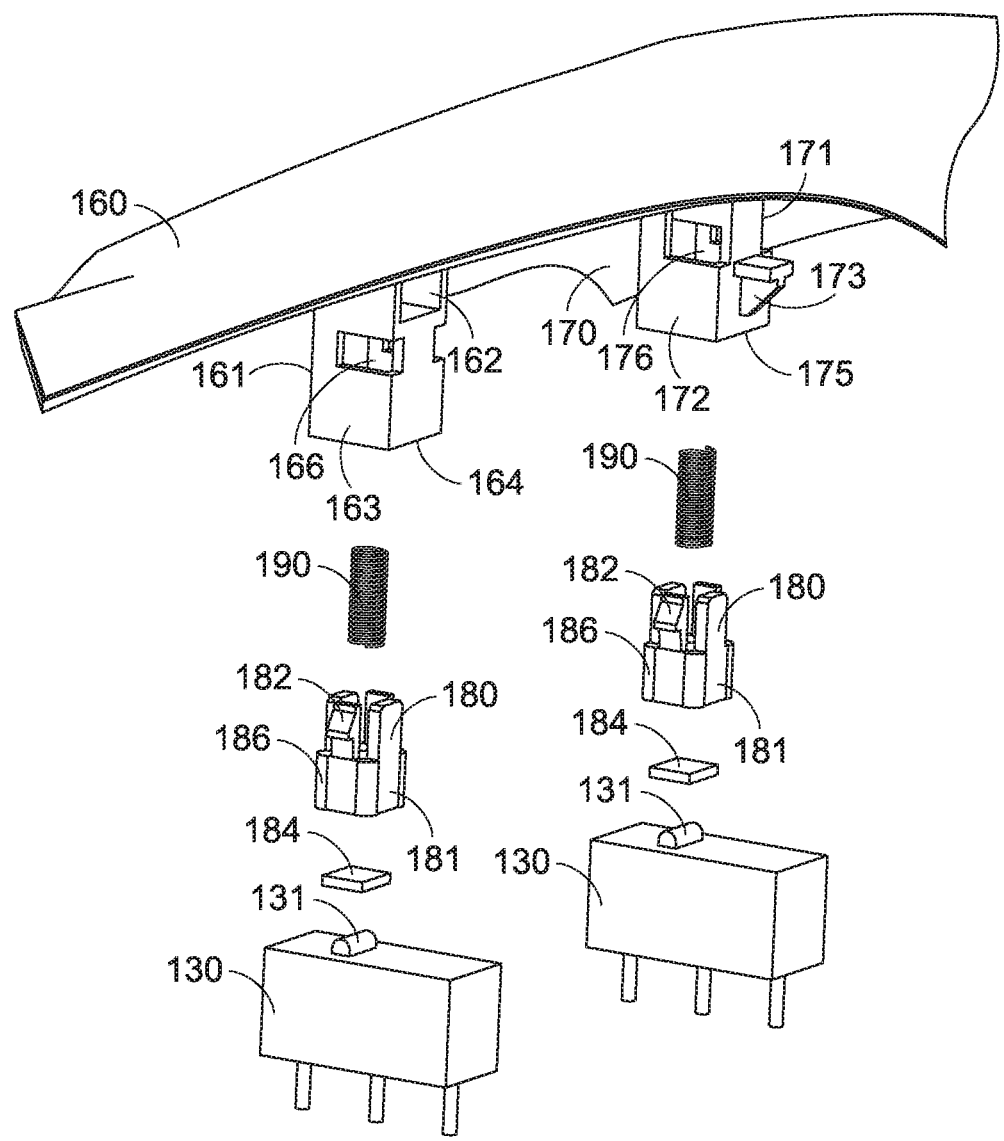
FIG. 3 is a schematic exploded view illustrating a portion of the mouse device as shown in FIG. 1.
Figure 4:
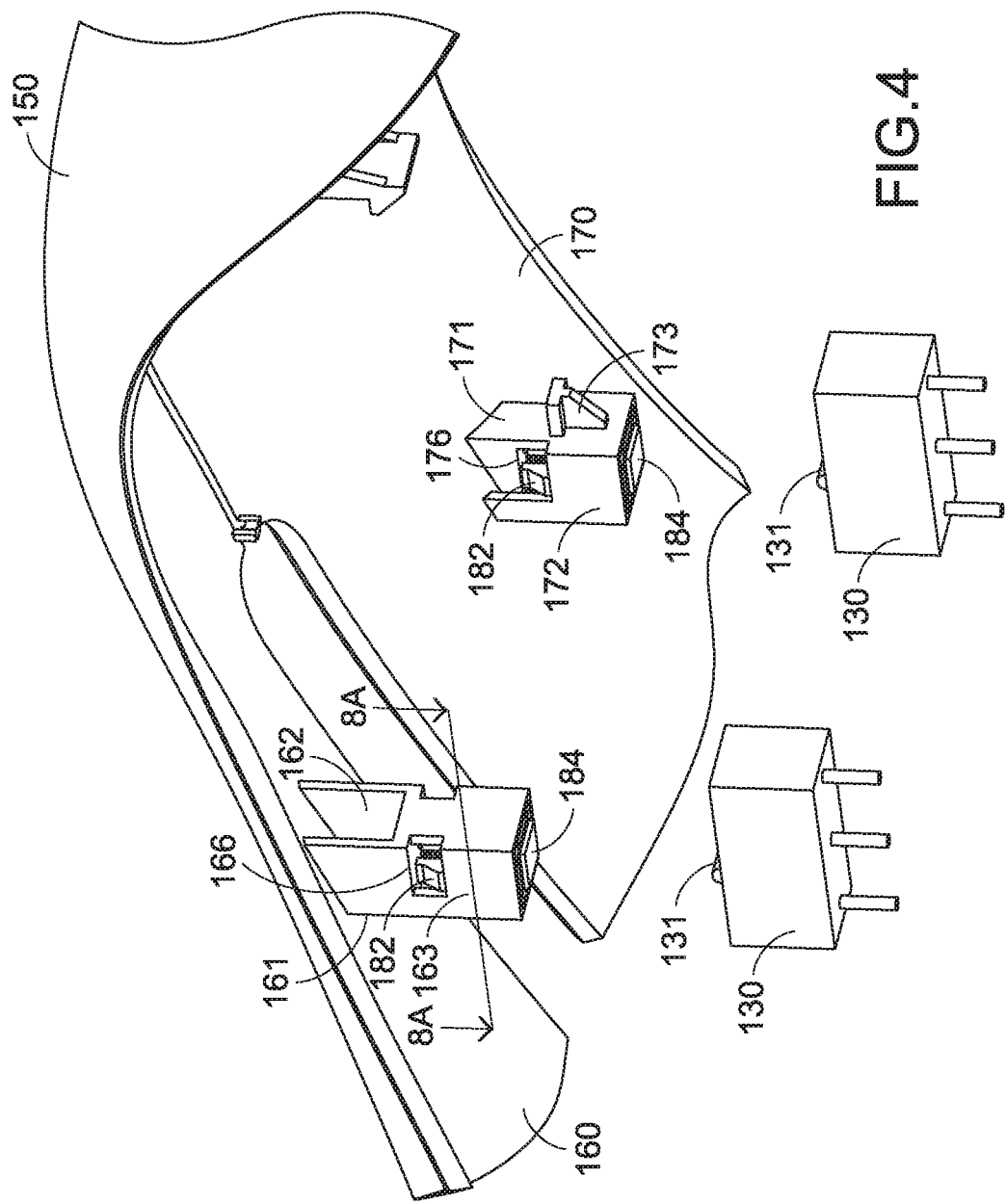
FIG. 4 is a schematic exploded view illustrating a portion of the mouse device as shown in FIG. 1.

A mouse device according to a first embodiment of the present invention will be illustrated with reference to FIGS. 1 to 7. FIG. 1 is a schematic perspective view illustrating a mouse device according to a first embodiment of the present invention. FIG. 2 is a schematic exploded view illustrating the mouse device as shown in FIG. 1. FIGS. 3 and 4 are schematic exploded views illustrating the relationships between a button plate, an elastic element, a slidable element and a switch of the mouse device as shown in FIG. 1. For clearly understanding the associated components, the middle frame is not shown in FIGS. 3 and 4. FIGS. 5A, 5B, 6 and 7 are cross-sectional views illustrating the mouse device of FIG. 1.

In this embodiment, the mouse device 100 at least comprises a middle frame 110, a bottom frame 120, at least one switch 130, a substrate 140, a button plate 150, at least one slidable element 180 and at least one elastic element 190.

Figure 6:
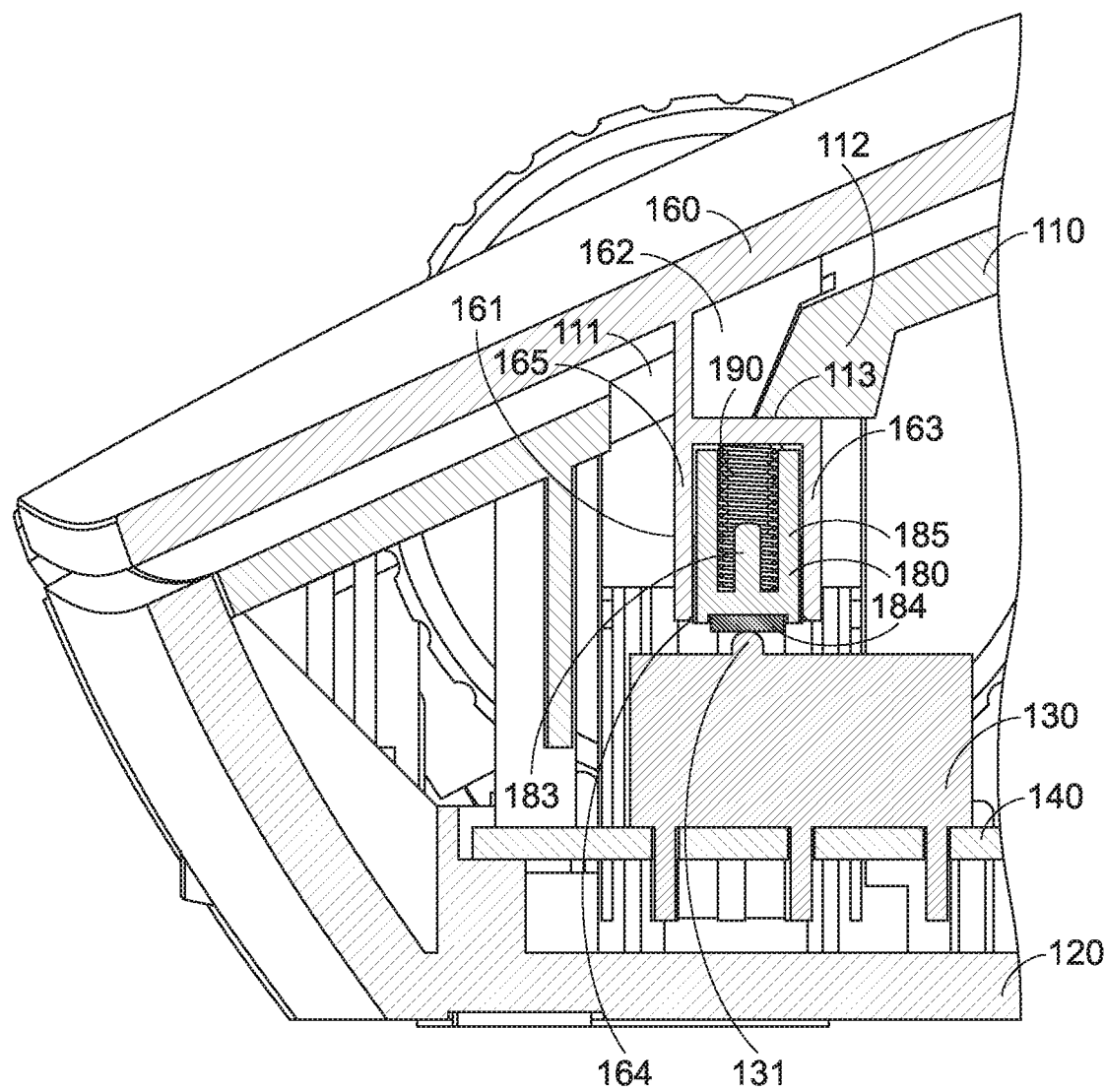
FIG. 6 is a schematic cross-sectional view illustrating the mouse device of FIG. 1 and taken along the line 6-6.
Figure 7:
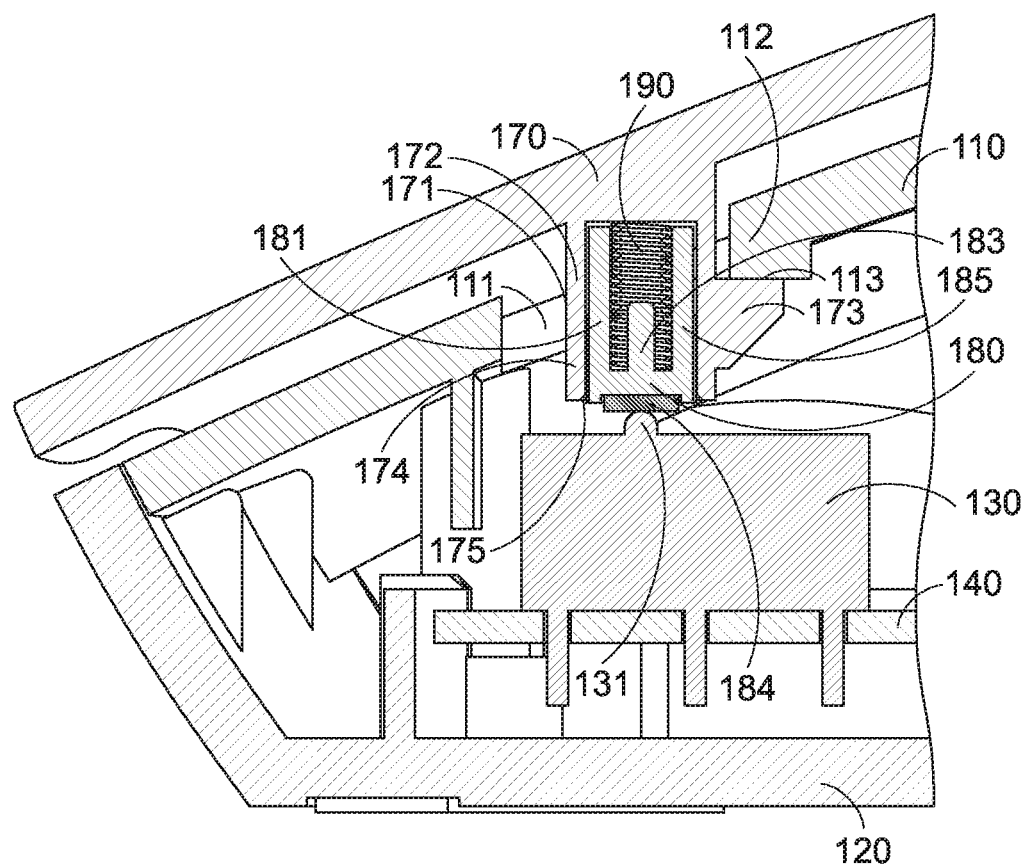
FIG. 7 is a schematic cross-sectional view illustrating the mouse device of FIG. 1 and taken along the line 7-7.

As shown in FIG. 2 and FIG. 6, the middle frame 110 is an important frame structure of the mouse device 100. In addition, an inner space of the mouse device 100 is defined by the middle frame 110 and the bottom frame 120 collaboratively. Preferably but not exclusively, the middle frame 110 and the bottom frame 120 are integrally formed as a one-piece structure. In an embodiment, the middle frame 110 comprises at least one opening part 111 and at least one hook 112. The hook 112 is located beside the corresponding opening part 111. In an embodiment, the hook 112 is internally protruded from an edge of the corresponding opening part 111. In other words, the hook 112 and the corresponding opening part 111 are integrally formed as a one-piece structure. In an embodiment, the hook 112 provides a contact surface 113. After a pressing rod of the button plate 150 (which will be described later) is penetrated through the opening part 111, the pressing rod of the button plate 150 can be upwardly pushed against the contact surface 113. Consequently, the pressing rod of the button plate 150 is not detached from the opening part 111.

The switch 130 is installed on the substrate 140 (e.g., a circuit board). Then, the substrate 140 is fixed on the middle frame 110 or the bottom frame 120. Consequently, the switch 130 can be securely fixed at a position of the substrate 140 under the middle frame 110. In an embodiment, the switch 130 comprises a triggering part 131. After the triggering part 131 is pressed down to a pre-pressing extent, the switch 130 is triggered to generate a pressing signal.

The button plate 150 is located over the middle frame 110. In an embodiment, the button plate 150 comprises a left button plate part 160 and a right button plate part 170. The button plate 150 is assembled with or fixed on the middle frame 110 of the mouse device 100. After the button plate 150 is pressed down to a certain extent by the user, the switch 130 is triggered to generate the pressing signal.

In an embodiment, the left button plate part 160 comprises a pressing rod 161. The pressing rod 161 is protruded downwardly from the left button plate part 160 or connected with a bottom surface of the left button plate part 160. When the left button plate part 160 is assembled with the middle frame 110, the pressing rod 161 is penetrated downwardly through the corresponding opening part 111 of the middle frame 110. The pressing rod 161 comprises a receiving groove 162 and a sleeve 163. The receiving groove 162 is located over the sleeve 163 and located near the left button plate part 160. The sleeve 163 is a hollow channel structure with an aperture 164 in the lower side. In addition, a perforation 166 is formed in a lateral wall 165 of the sleeve 163.

In an embodiment, the right button plate part 170 of the mouse device 100 comprises a pressing rod 171. The pressing rod 171 is protruded downwardly from the right button plate part 170 or connected with a bottom surface of the right button plate part 170. When the right button plate part 170 is assembled with the middle frame 110, the pressing rod 171 is penetrated downwardly through the corresponding opening part 111 of the middle frame 110. The pressing rod 171 of the right button plate part 170 is distinguished from the pressing rod 161 of the left button plate part 160. For example, the pressing rod 171 is shorter than the pressing rod 161. In addition, the pressing rod 171 comprises a sleeve 172 and a hook 173 only. The hook 173 is disposed on an external surface of a lateral wall 174 of the sleeve 172. The sleeve 172 is a hollow channel structure with an aperture 175 in the lower side. In addition, a perforation 176 is formed in the lateral wall 174 of the sleeve 172.

In the above embodiment, the pressing rod 161 of the left button plate part 160 is longer than the pressing rod 171 of the right button plate part 170. It is noted that numerous modifications and alterations may be made while retaining the teachings of the invention. For example, in another embodiment, the length of the pressing rod 161 of the left button plate part 160 is equal to the length of the pressing rod 171 of the right button plate part 170. Alternatively, the pressing rod 171 of the right button plate part 170 is longer than the pressing rod 161 of the left button plate part 160.

In an embodiment of the mouse device 100, the operations of the pressing rod 171 of the right button plate part 170 are similar to the operations of the pressing rod 161 of the left button plate part 160. In addition, the connection relationships between the pressing rod 171 of the right button plate part 170, the corresponding slidable element 180 and the corresponding elastic element 190 are similar to the connection relationships between the pressing rod 161 of the left button plate part 160, the corresponding slidable element 180 and the corresponding elastic element 190. For succinctness, only the left button plate part 160 and its pressing rod 161 will be illustrated in the following descriptions and drawings.

The structure of the mouse device 100 is specially designed. Consequently, the empty stroke between the left button plate part 160 and the corresponding switch 130 or the empty stroke between the right button plate part 170 and the corresponding switch 130 can be avoided, and the excessive pre-pressing problem of the left button plate part 160 or the right button plate part 170 can be avoided. In accordance with the structural design, one slidable element 180 and one elastic element 190 are installed within each of the sleeves 163 and 172. An example of the elastic element 190 is a spring.

The slidable element 180 comprises a sleeve 181 and a hook 182. Moreover, a positioning rod 183 is disposed within the sleeve 181. The elastic element 190 can be previously installed within the sleeve 181. In case that the elastic element 190 is the spring, the spring can be previously sheathed around the positioning rod 183. In an embodiment, the corresponding slidable elements 180 are inserted into the pressing rods 161 and 171 through the apertures 164 and 175, respectively. When the hook 182 of the slidable element 180 is engaged with the perforation 166 of the sleeve 163 (or the perforation 176 of the sleeve 172), the slidable element 180, the corresponding pressing rod 161

(or the pressing rod 171) and the corresponding elastic element 190 are assembled with each other. In this embodiment, the elastic element 190 is arranged between the corresponding slidable element 180 and the corresponding pressing rod 161 (or the pressing rod 171). Consequently, the receiving groove 162 of the pressing rod 161 or the hook 173 of the pressing rod 171 is upwardly pushed against the contact surface 113 of the hook 112 of the middle frame 110, and the sleeve 181 of the slidable element 180 is downwardly pushed against the triggering part 131 of the switch 130. In this way, a pre-pressing effect is generated. However, in response to the pre-pressing effect, the switch 130 is not triggered to generate the pressing signal.

Figure 5A:
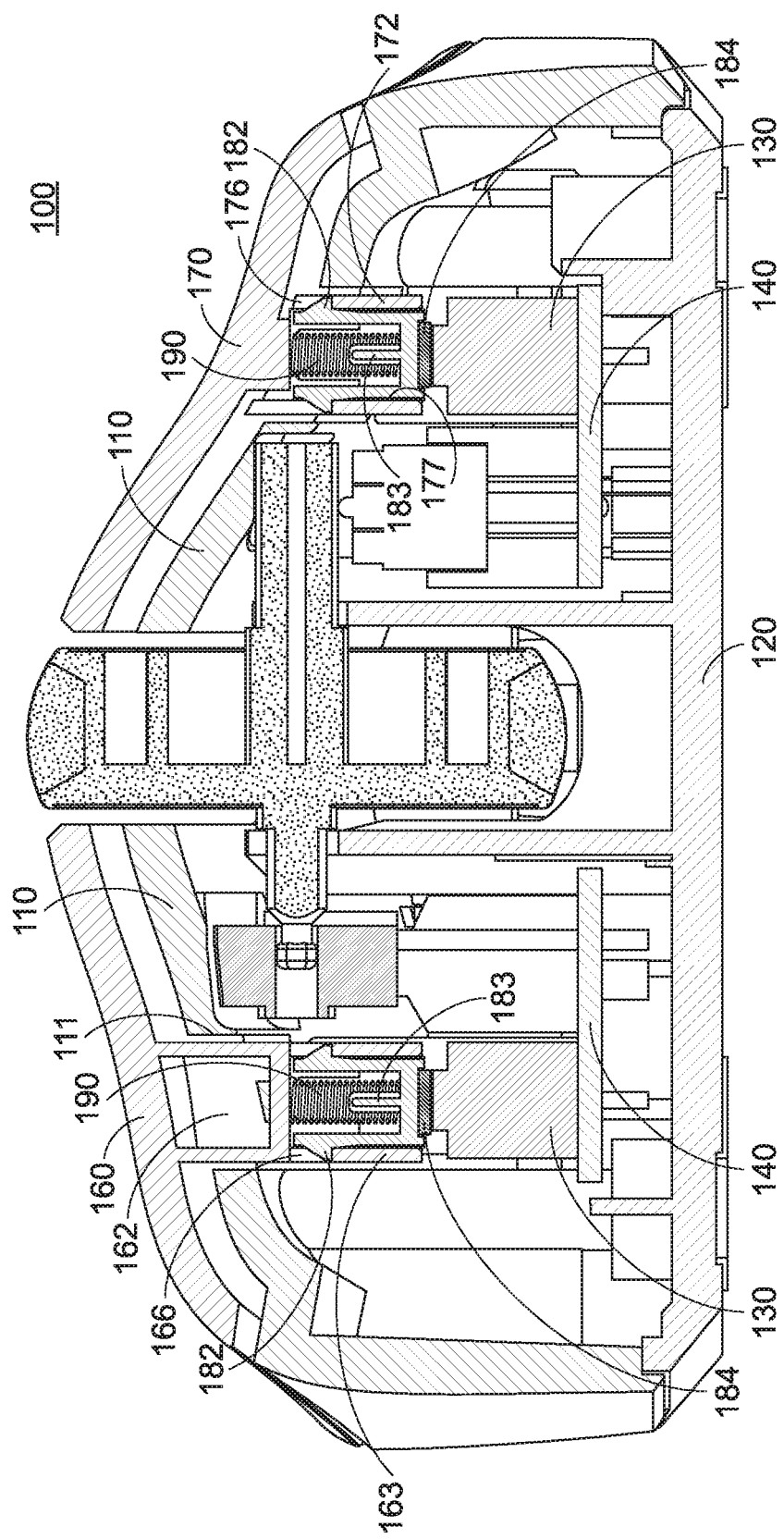
FIG. 5A is a schematic cross-sectional view illustrating the mouse device of FIG. 1 and taken along the line 5A-5A.
Figure 5B:
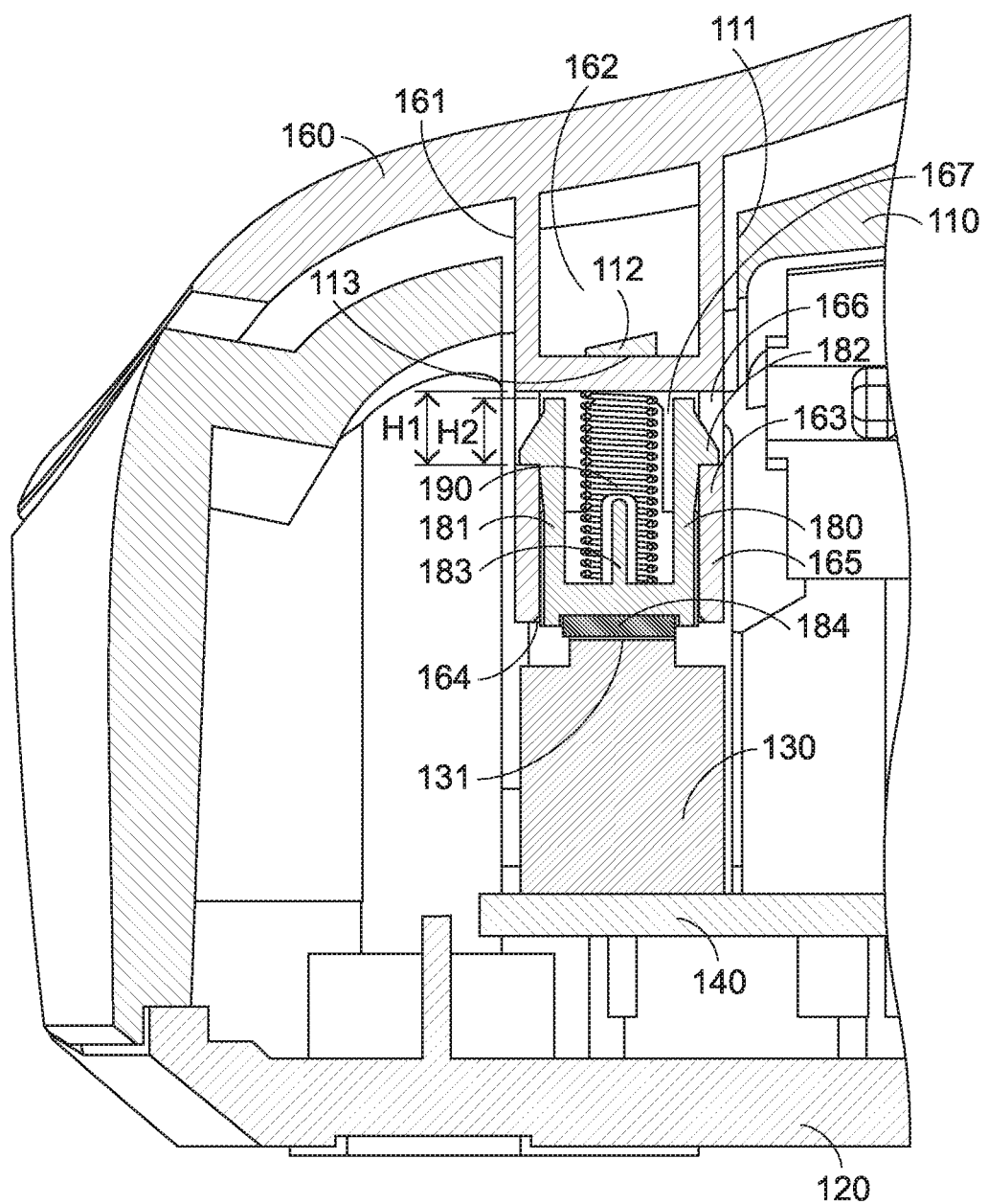
FIG. 5B is a schematic enlarged view of the mouse device as shown in FIG. 5A.

In FIG. 5B, the enlarged view of a portion of the inner structure of the mouse device 100 is shown. In this embodiment, the switch 130 is securely fixed at a position under the middle frame 110 (or within the middle frame 110). Consequently, the distance between the triggering part 131 of the switch 130 and the hook 112 of the middle frame 110 (especially the contact surface 113 of the hook 112) is kept unchanged. Moreover, the length H1 of the perforation 166 of the sleeve 163 (or the perforation 176 of the sleeve 172) is larger than the length H2 of the hook 182. In other words, the perforation 166 of the sleeve 163 (or the perforation 176 of the sleeve 172) provides a gap 167 or a space for allowing the corresponding slidable element 180 to be moved within the sleeve 163 (or the sleeve 172). Consequently, the elastic element 190 can absorb the production tolerances or the assembling tolerances of the associated components (e.g., the middle frame 110, the button plate 150, the pressing rod 161 or 171, the corresponding switch 130 and the substrate 140) and avoid the empty stroke between the pressing rod 161 (or the pressing rod 171) and the corresponding switch 130.

As mentioned above, the slidable element 180 and the elastic element 190 can be directly installed in the corresponding pressing rod 161 (or the pressing rod 171). Since it is not necessary to largely change the specifications or structures of other cooperative components of the mouse device 100, the mass production cost of the mouse device 100 is reduced. Moreover, the slidable element 180 is fixed in the perforation 166 of the pressing rod 161 (or the perforation 176 of the pressing rod 171) through the hook 182. In case that the slidable element 180 (or the elastic element 190) needs to be replaced with a new one in a different specification, the user can push the hook 182 inwardly to eject the slidable element 180 from the perforation 166 of the sleeve 163 (or the perforation 176 of the sleeve 172). Consequently, the convenience of maintaining or replacing components will be enhanced.

While the slidable element 180 is moved within the sleeve 163 of the pressing rod 161 (or the sleeve 172 of the pressing rod 171), a friction force is generated, and powdery material is possibly generated. For avoiding the generation of the powdery material, the slidable element 180 is made of the material with high lubricity and high wear resistance. For example, the material of the slidable element 180 is selected from at least one of acrylonitrile butadiene styrene (ABS), polycarbonate (PC), polyoxymethylene (POM) and polytetrafluoroethylene (PTFE).

In an embodiment, the mouse device 100 further comprises at least one buffering pad 184. The buffering pad 184 is attached on an external surface of the corresponding sleeve 181, or the buffering pad 184 is arranged between the corresponding sleeve 181 and the triggering part 131 of the corresponding switch 130. The arrangement of the buffering pad 184 can increase the capability of withstanding abrasion and extend the use life of the mouse device 100. In addition, the arrangement of the buffering pad 184 can maintain the tiny interference between the corresponding sleeve 181 and the triggering part 131 of the corresponding switch 130. For example, the material of the buffering pad 184 is selected from at least one of polytetrafluoroethylene (PTFE) and ultra-high molecular weight polyethylene (UPE).

As mentioned above, the special material of the slidable element 180 and the arrangement of the buffering pad 184 can reduce the influence of the friction force. Furthermore, the structure of the mouse device 100 is specially designed to reduce the friction force when the slidable element 180 is moved within the sleeve 163 of the pressing rod 161 (or the sleeve 172 of the pressing rod 171), and thus the jammed problem is effectively avoided. Hereinafter, some examples of the structural improvements of the mouse device to reduce the friction force and avoid the jammed problem will be described as follows.

Figure 8A:
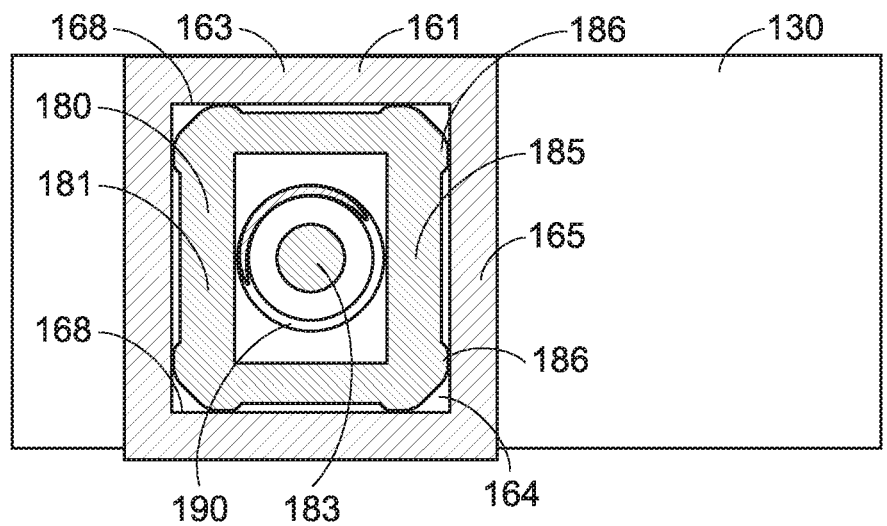
FIG. 8A is a schematic cross-sectional view illustrating of the sleeve of the pressing rod and the sleeve of the slidable element of the mouse device as shown in FIG. 4 and taken along the line 8A-8A.

FIG. 8A is a schematic cross-sectional view illustrating of the sleeve of the pressing rod and the sleeve of the slidable element of the mouse device as shown in FIG. 4 and taken along the line 8A-8A. As shown in FIG. 8A, a protrusion edge structure 186 is formed on a lateral wall 185 of the sleeve 181 of the slidable element 180. The protrusion edge structure 186 is contacted with an inner wall 168 of the sleeve 163 (or an inner wall 177 of the sleeve 172). Consequently, the sleeve 181 of the slidable element 180 is contacted with the inner wall 168 of the sleeve 163 (or the inner wall 177 of the sleeve 172) in a line contact manner instead of the surface contact manner. Consequently, the friction force therebetween is reduced. In other words, while the slidable element 180 is moved within the sleeve 163 of the pressing rod 161 (or the sleeve 172 of the pressing rod 171), the jammed problem is avoided.

Figure 8B:
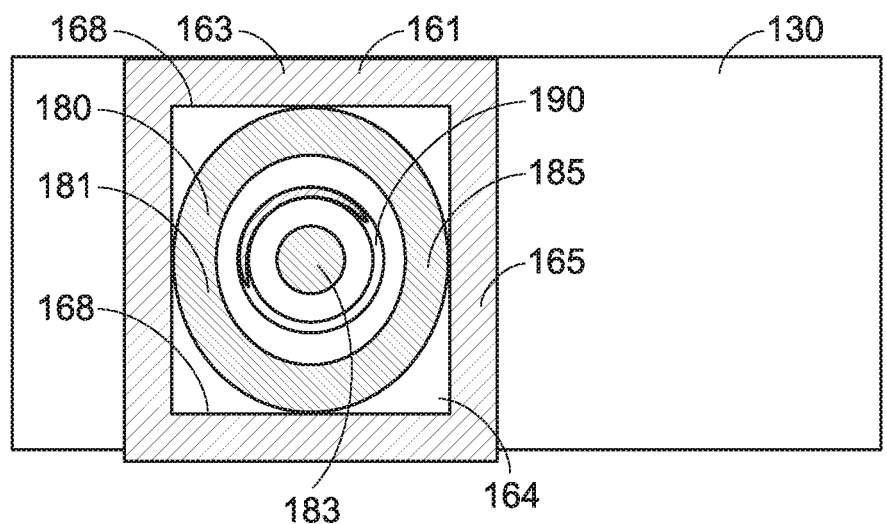
FIG. 8B is a schematic cross-sectional view illustrating of the sleeve of the pressing rod and the sleeve of the slidable element in a variant example of the mouse device as shown in FIG. 8A.

In a variant example, the shape of the slidable element 180 is changed. FIG. 8B is a schematic cross-sectional view illustrating of the sleeve of the pressing rod and the sleeve of the slidable element in a variant example of the mouse device as shown in FIG. 8A. As shown in FIG. 8B, the lateral wall 185 of the sleeve 181 has a cylindrical profile. Consequently, the sleeve 181 of the slidable element 180 is contacted with the inner wall 168 of the sleeve 163 (or the inner wall 177 of the sleeve 172) in the line contact manner.

Figure 8C:
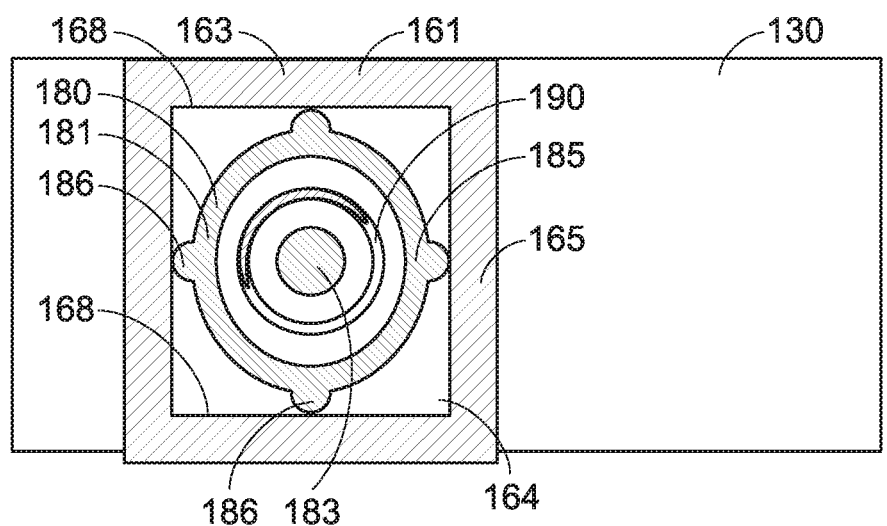
FIG. 8C is a schematic cross-sectional view illustrating of the sleeve of the pressing rod and the sleeve of the slidable element in another variant example of the mouse device as shown in FIG. 8A.

FIG. 8C is a schematic cross-sectional view illustrating of the sleeve of the pressing rod and the sleeve of the slidable element in another variant example of the mouse device as shown in FIG. 8A. As shown in FIG. 8C, the lateral wall 185 of the sleeve 181 also has a cylindrical profile. In addition, a protrusion edge structure 186 is formed on the lateral wall 185 of the sleeve 181. Consequently, the friction force therebetween is reduced. In this way, while the slidable element 180 is moved within the sleeve 163 of the pressing rod 161 (or the sleeve 172 of the pressing rod 171), the jammed problem is avoided.

Figure 9:
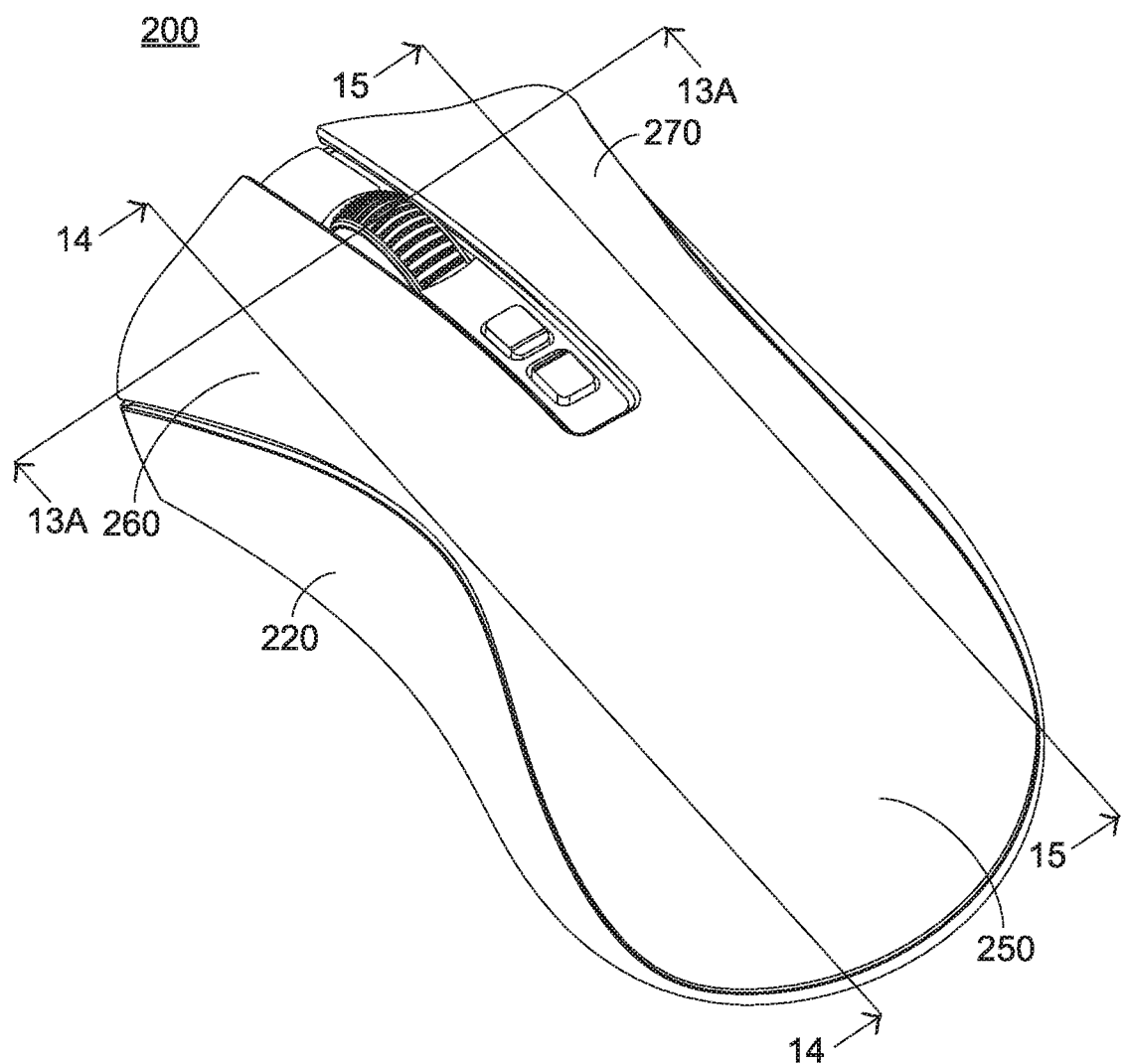
FIG. 9 is a schematic perspective view illustrating a mouse device according to a second embodiment of the present invention.
Figure 10:
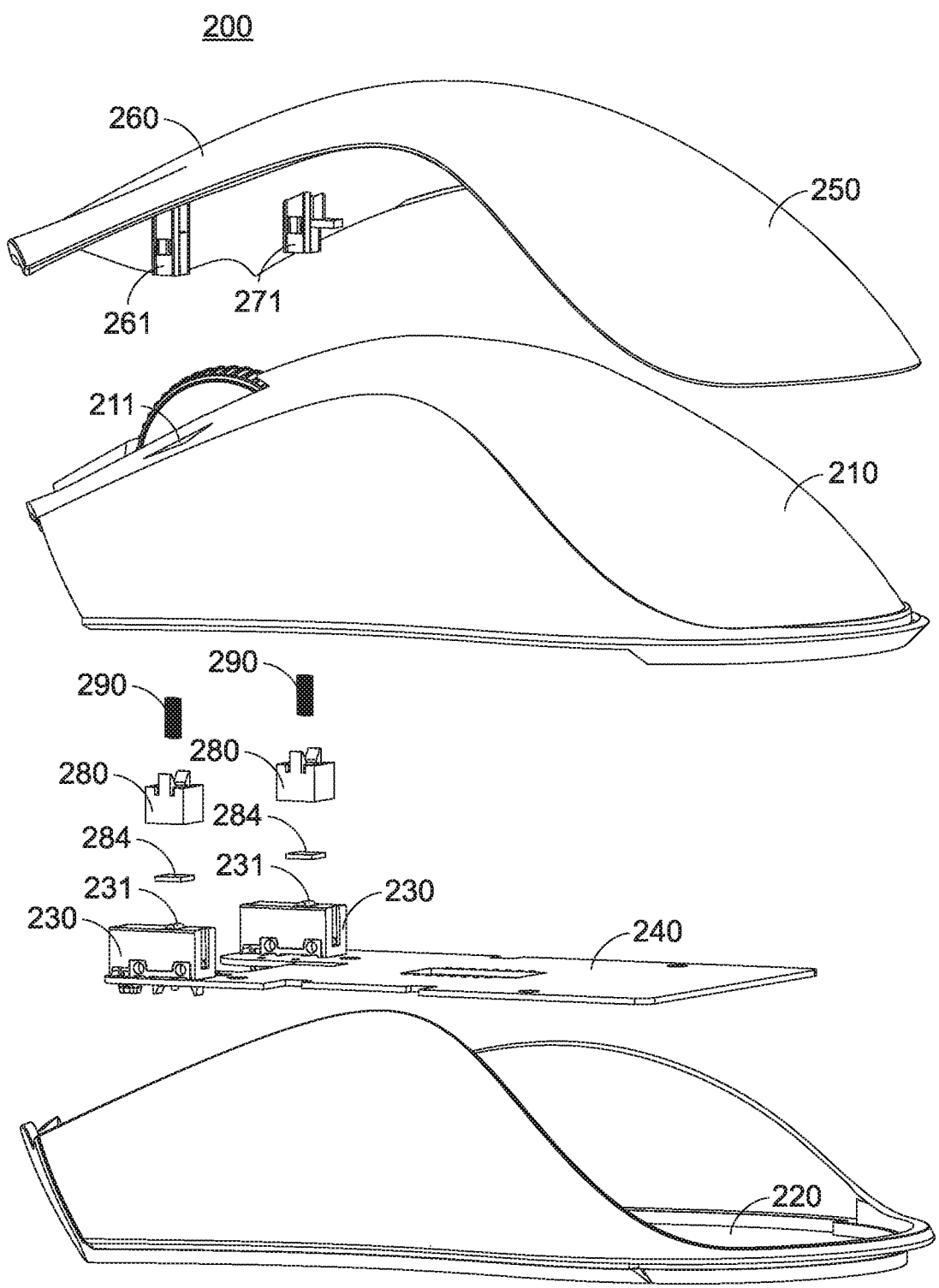
FIG. 10 is a schematic exploded view illustrating the mouse device as shown in FIG. 9.
Figure 11:
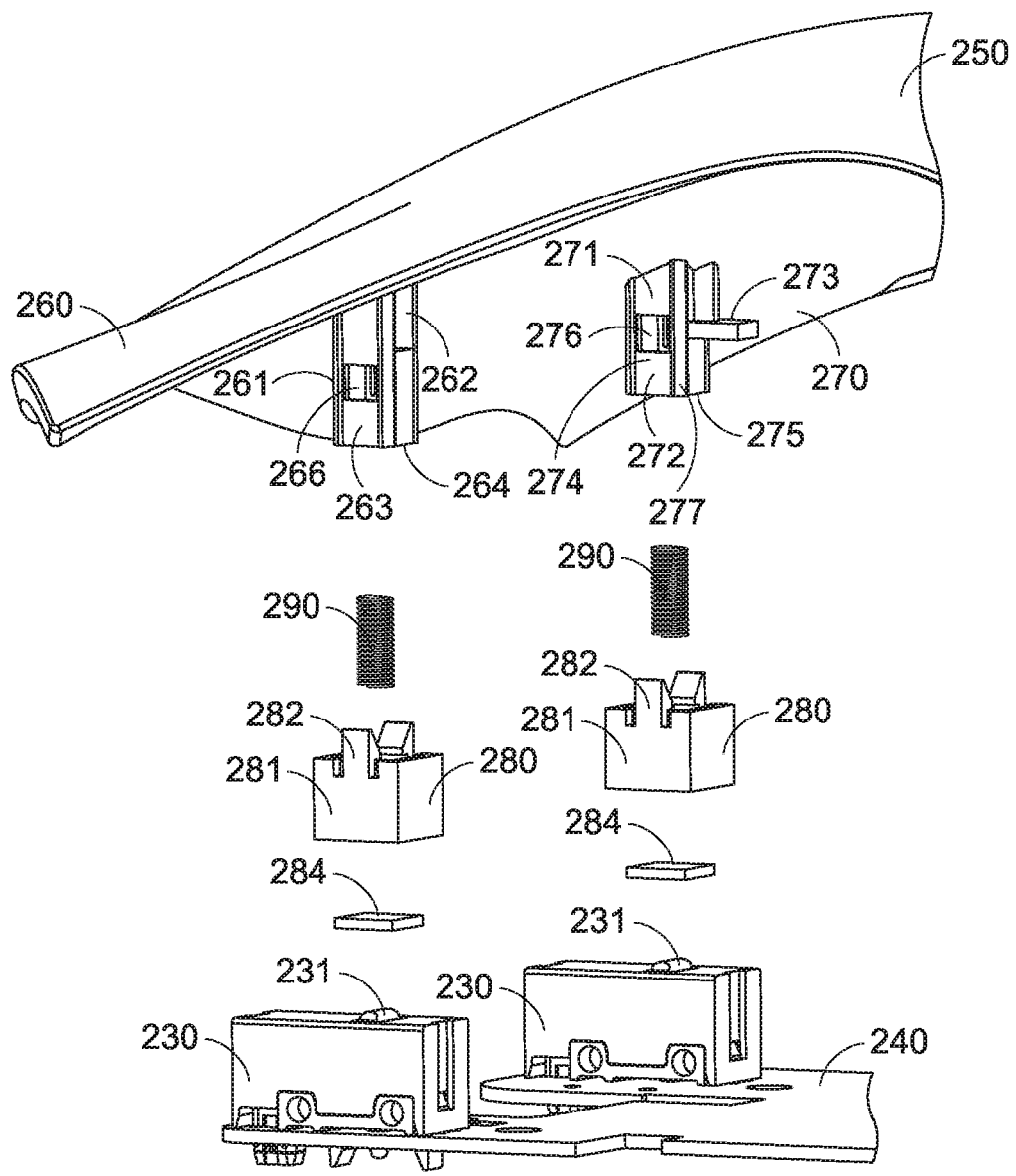
FIG. 11 is a schematic exploded view illustrating a portion of the mouse device as shown in FIG. 9.
Figure 12:
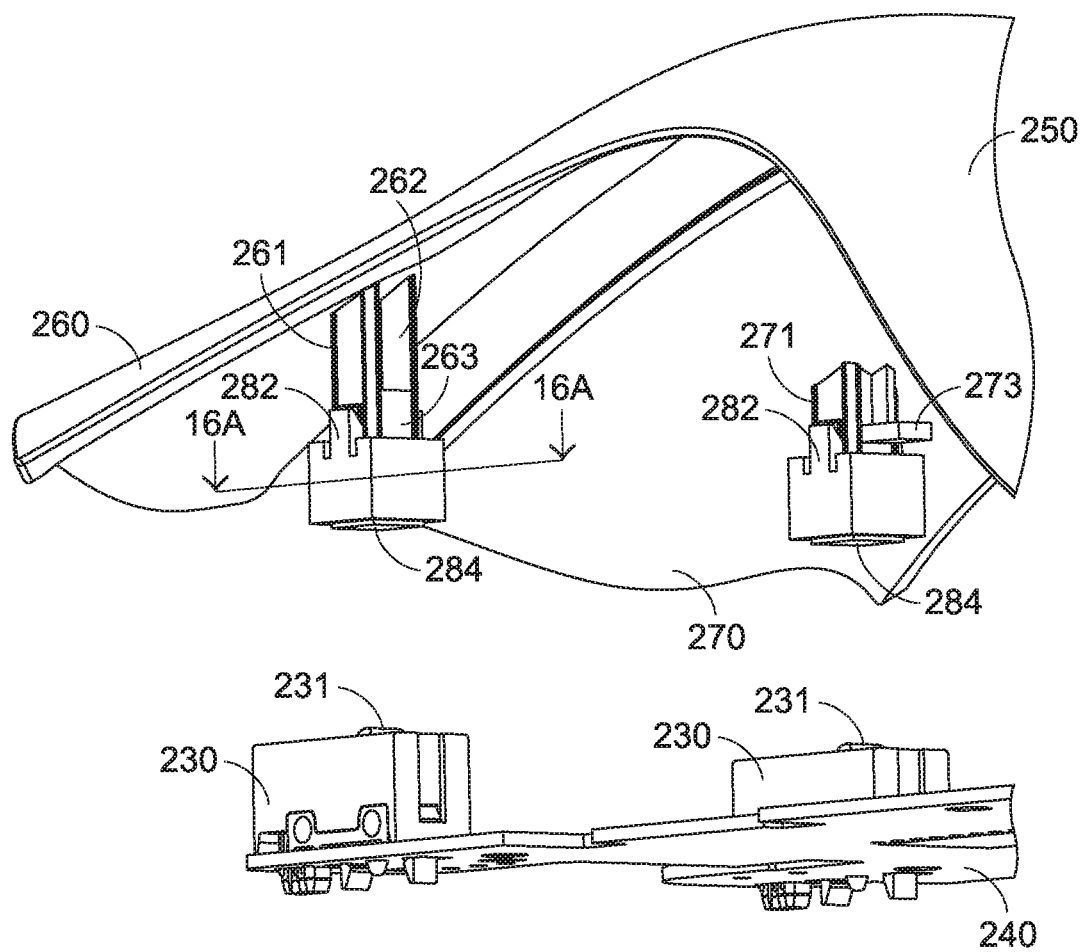
FIG. 12 is a schematic exploded view illustrating a portion of the mouse device as shown in FIG. 9.

A mouse device according to a second embodiment of the present invention will be illustrated with reference to FIGS. 9 to 15. FIG. 9 is a schematic perspective view illustrating a mouse device according to a second embodiment of the present invention. FIG. 10 is a schematic exploded view illustrating the mouse device as shown in FIG. 9. FIGS. 11 and 12 are schematic exploded views illustrating the relationships between a button plate, an elastic element, a slidable element and a switch of the mouse device as shown in FIG. 9. For clearly understanding the associated components, the middle frame is not shown in FIGS. 11 and 12. FIGS. 13A, 13B, 14 and 15 are cross-sectional views illustrating the mouse device of FIG. 9.

In this embodiment, the mouse device 200 at least comprises a middle frame 210, a bottom frame 220, at least one switch 230, a substrate 240, a button plate 250, at least one slidable element 280 and at least one elastic element 290.

Figure 14:
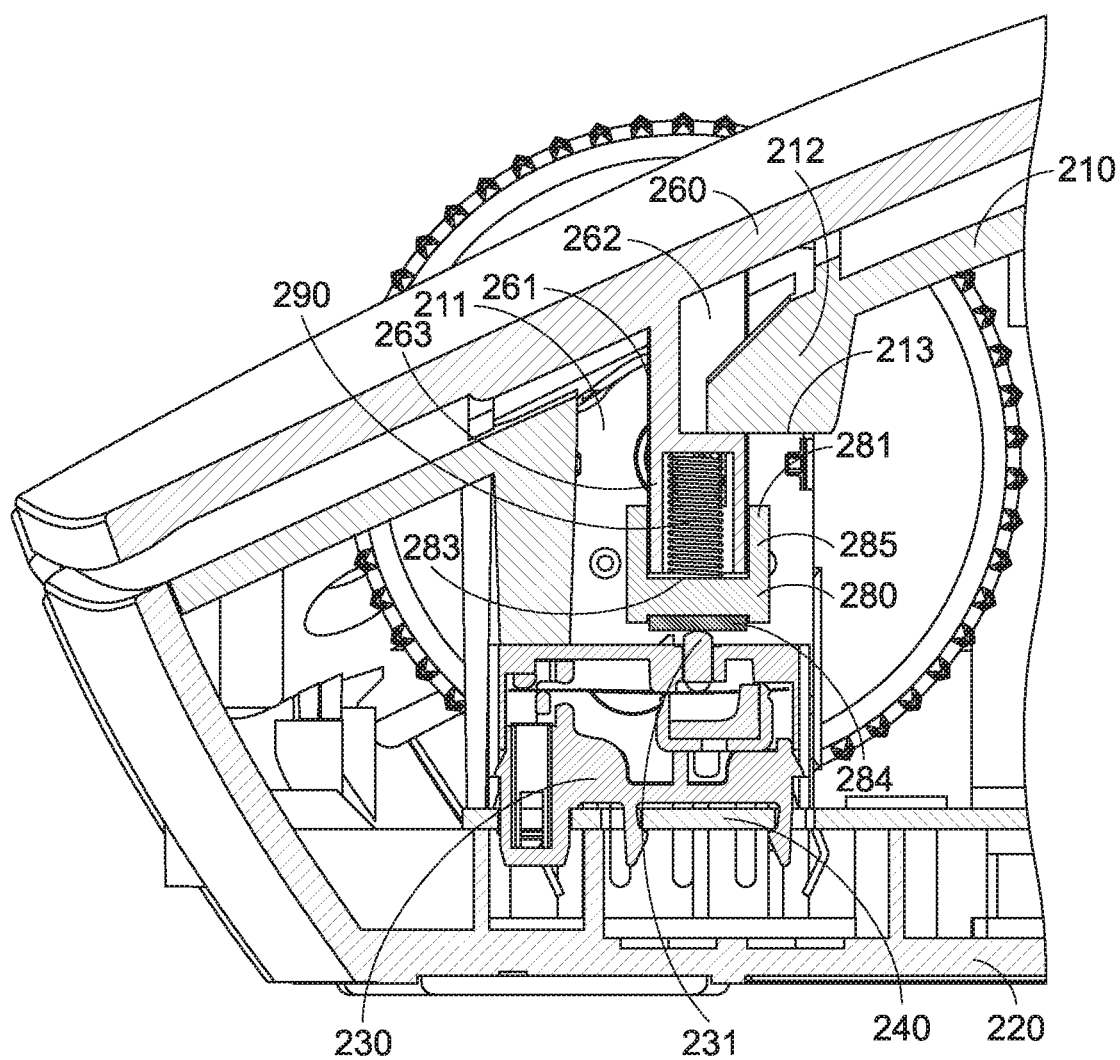
FIG. 14 is a schematic cross-sectional view illustrating the mouse device of FIG. 9 and taken along the line 14-14.
Figure 15:
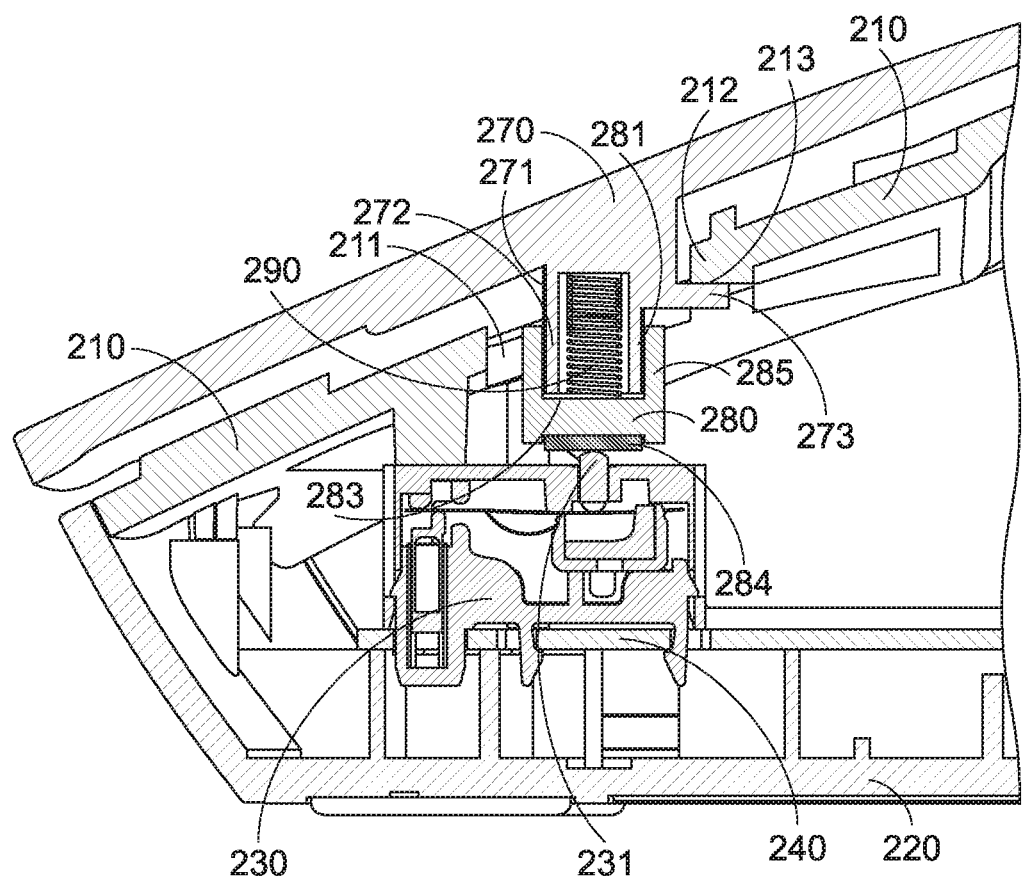
FIG. 15 is a schematic cross-sectional view illustrating the mouse device of FIG. 9 and taken along the line 15-15.

As shown in FIG. 10 and FIG. 14, the middle frame 210 is an important frame structure of the mouse device 200. In addition, an inner space of the mouse device 200 is defined by the middle frame 210 and the bottom frame 220 collaboratively. Preferably but not exclusively, the middle frame 210 and the bottom frame 220 are integrally formed as a one-piece structure. In an embodiment, the middle frame 210 comprises at least one opening part 211 and at least one hook 212. The hook 212 is located beside the corresponding opening part 211. In an embodiment, the hook 212 is internally protruded from an edge of the corresponding opening part 211. In other words, the hook 212 and the corresponding opening part 211 are integrally formed as a one-piece structure. In an embodiment, the hook 212 provides a contact surface 213. After a pressing rod of the button plate 250, which will be described later, is penetrated through the opening part 211, the pressing rod of the button plate 250 can be upwardly pushed against the contact surface 213. Consequently, the pressing rod of the button plate 250 is not detached from the opening part 211.

The switch 230 is installed on the substrate 240 (e.g., a circuit board). Then, the substrate 240 is fixed on the middle frame 210 or the bottom frame 220. Consequently, the switch 230 can be securely fixed at a position of the substrate 240 under the middle frame 210. In an embodiment, the switch 230 comprises a triggering part 231. After the triggering part 231 is pressed down to a pre-pressing extent, the switch 230 is triggered to generate a pressing signal.

The button plate 250 is located over the middle frame 210. In an embodiment, the button plate 250 comprises a left button plate part 260 and a right button plate part 270. The button plate 250 is assembled with or fixed on the middle frame 210 of the mouse device 200. After the button plate 250 is pressed down to a certain extent by the user, the switch 230 is triggered to generate the pressing signal.

In an embodiment, the left button plate part 260 comprises a pressing rod 261. The pressing rod 261 is protruded downwardly from the left button plate part 260 or connected with a bottom surface of the left button plate part 260. When the left button plate part 260 is assembled with the middle frame 210, the pressing rod 261 is penetrated downwardly through the corresponding opening part 211 of the middle frame 210. The pressing rod 261 comprises a receiving groove 262 and a sleeve 263. The receiving groove 262 is located over the sleeve 263 and located near the left button plate part 260. The sleeve 263 is a hollow channel structure with an aperture 264 in the lower side. In addition, a perforation 266 is formed in a lateral wall 265 of the sleeve 263.

In an embodiment, the right button plate part 270 of the mouse device 200 comprises a pressing rod 271. The pressing rod 271 is protruded downwardly from the right button plate part 270 or connected with a bottom surface of the right button plate part 270. When the right button plate part 270 is assembled with the middle frame 210, the pressing rod 271 is penetrated downwardly through the corresponding opening part 211 of the middle frame 210. The pressing rod 271 of the right button plate part 270 is distinguished from the pressing rod 261 of the left button plate part 260. For example, the pressing rod 271 is shorter than the pressing rod 261. In addition, the pressing rod 271 comprises a sleeve 272 and a hook 273 only. The hook 273 is disposed on an external surface of a lateral wall 274 of the sleeve 272. The sleeve 272 is a hollow channel structure with an aperture 275 in the lower side. In addition, a perforation 276 is formed in the lateral wall 274 of the sleeve 272.

In the above embodiment, the pressing rod 261 of the left button plate part 260 is longer than the pressing rod 271 of the right button plate part 270. It is noted that numerous modifications and alterations may be made while retaining the teachings of the invention. For example, in another embodiment, the length of the pressing rod 261 of the left button plate part 260 is equal to the length of the pressing rod 271 of the right button plate part 270. Alternatively, the pressing rod 271 of the right button plate part 270 is longer than the pressing rod 261 of the left button plate part 260.

In an embodiment of the mouse device 200, the operations of the pressing rod 271 of the right button plate part 270 are similar to the operations of the pressing rod 261 of the left button plate part 260. In addition, the connection relationships between the pressing rod 271 of the right button plate part 270, the corresponding slidable element 280 and the corresponding elastic element 290 are similar to the connection relationships between the pressing rod 261 of the left button plate part 260, the corresponding slidable element 280 and the corresponding elastic element 290. For succinctness, only the left button plate part 260 and its pressing rod 261 will be illustrated in the following descriptions and drawings.

The structure of the mouse device 200 is specially designed. Consequently, the empty stroke between the left button plate part 260 and the corresponding switch 230 or the empty stroke between the right button plate part 270 and the corresponding switch 230 can be avoided, and the excessive pre-pressing problem of the left button plate part 260 or the right button plate part 270 can be avoided. In accordance with the structural design, two slidable elements 280 are sheathed around the sleeves 263 and 272, respectively. In addition, one elastic element 290 is arranged between the sleeve 263 and the corresponding slidable element 280, and another elastic element 290 is arranged between the sleeve 272 and the corresponding slidable element 280. An example of the elastic element 290 is a spring.

The slidable element 280 comprises a sleeve 281 and a hook 282. Moreover, the sleeve 281 has an inner bottom surface 283. The elastic element 290 can be previously installed within the sleeve 281 of the corresponding slidable element 280 or installed within the sleeve 263 of the pressing rod 261 (or the sleeve 272 of the pressing rod 271). The aperture 264 of the pressing rod 261 and the aperture 275 of the pressing rod 271 can be sealed by the sleeves 281 of the corresponding slidable elements 280. In addition, the slidable element 280 can be moved upwardly (or continuously) for a certain distance. When the hook 282 of the slidable element 280 is engaged with the perforation 266 of the sleeve 263 (or the perforation 276 of the sleeve 272), the slidable element 280, the corresponding pressing rod 261 (or the pressing rod 271) and the corresponding elastic element 290 are assembled with each other. In this embodiment, the elastic element 290 is arranged between the corresponding slidable element 280 and the corresponding pressing rod 261 (or the pressing rod 271). Consequently, the receiving groove 262 of the pressing rod 261 or the hook 273 of the pressing rod 271 is upwardly pushed against the contact surface 213 of the hook 212 of the middle frame 210, and the sleeve 281 of the slidable element 280 is downwardly pushed against the triggering part 231 of the switch 230. In this way, a pre-pressing effect is generated. However, in response to the pre-pressing effect, the switch 230 is not triggered to generate the pressing signal.

Figure 13A:
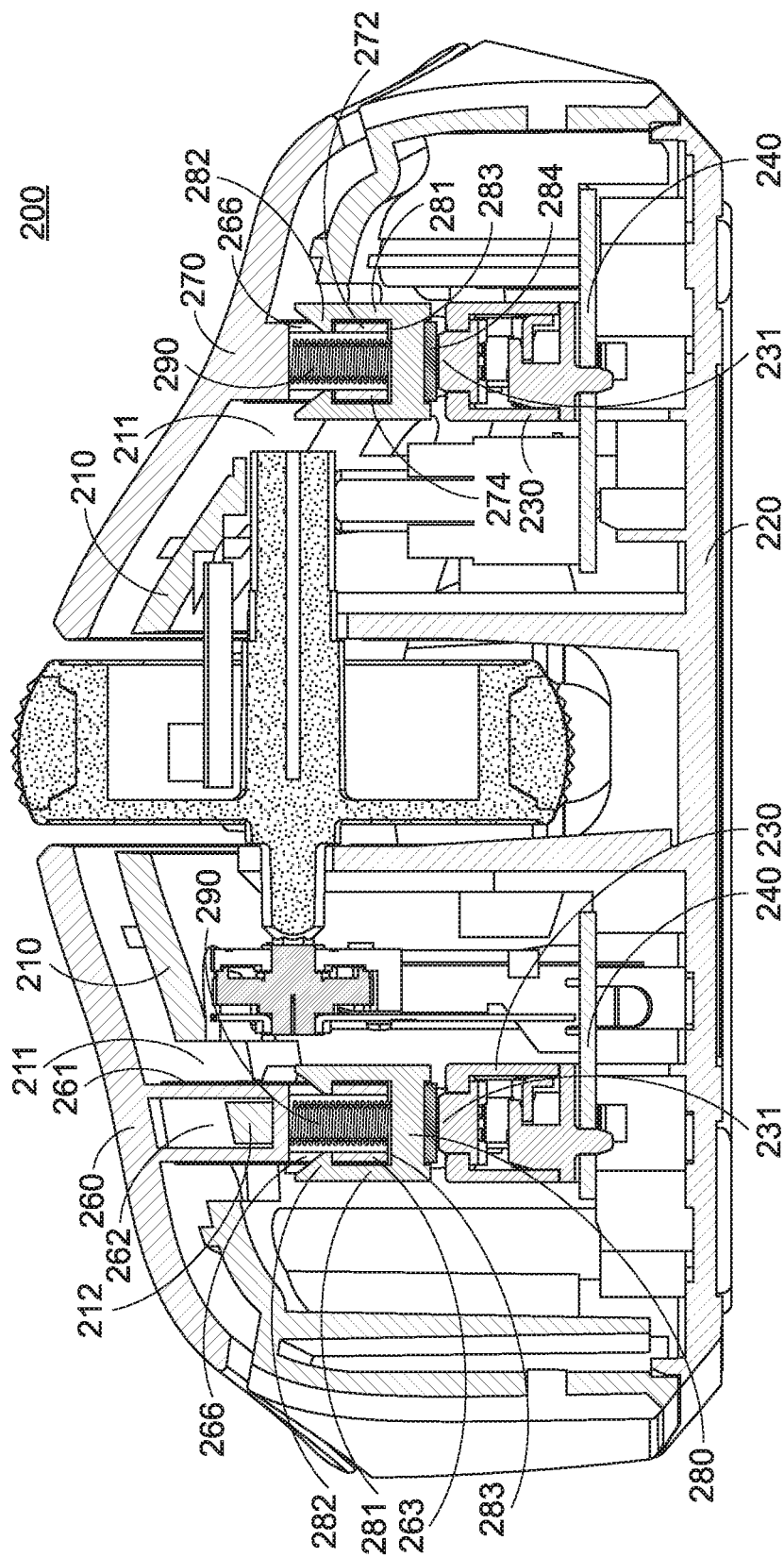
FIG. 13A is a schematic cross-sectional view illustrating the mouse device of FIG. 9 and taken along the line 13A-13A.
Figure 13B:
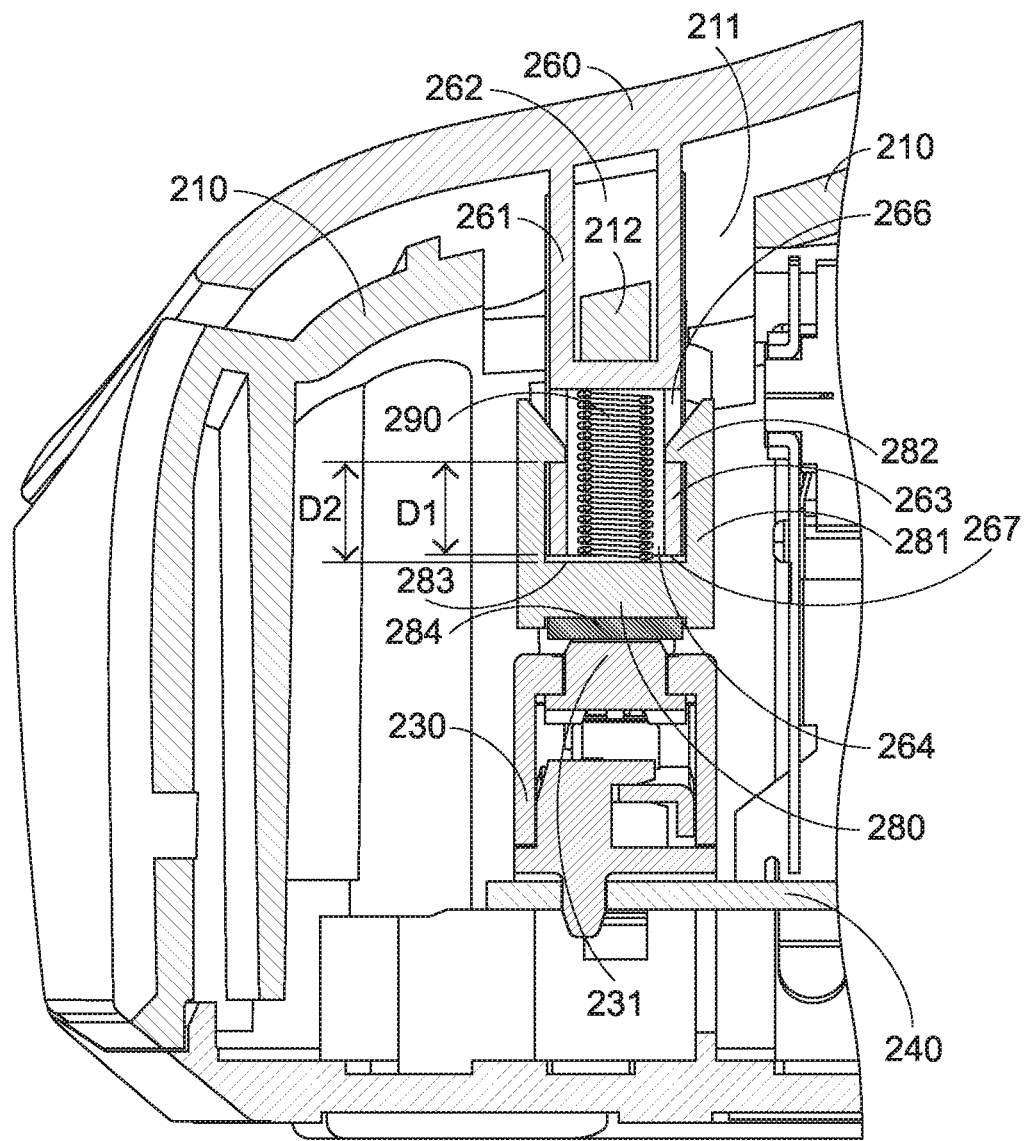
FIG. 13B is a schematic enlarged view of the mouse device as shown in FIG. 13A.

In FIG. 13B, the enlarged view of a portion of the inner structure of the mouse device 200 is shown. In this embodiment, the switch 230 is securely fixed at a position under the middle frame 210 (or within the middle frame 210). Consequently, the distance between the triggering part 231 of the switch 230 and the hook 212 of the middle frame 210 (especially the contact surface 213 of the hook 212) is kept unchanged. Moreover, the distance D1 of the perforation 266 of the sleeve 263 (or the perforation 276 of the sleeve 272) is smaller than the distance D2 between the hook 282 of the slidable element 280 and the inner bottom surface 283 of the sleeve 281. In other words, the sleeve 263 (or the sleeve 272) provides a gap or a space for allowing the corresponding slidable element 280 to be moved within the sleeve 263 (or the sleeve 272). Consequently, the elastic element 290 can absorb the production tolerances or the assembling tolerances of the associated components (e.g., the middle frame 210, the button plate 250, the pressing rod 261 or 271, the corresponding switch 230 and the substrate 240) and avoid the empty stroke between the pressing rod 261 (or the pressing rod 271) and the corresponding switch 230.

As mentioned above, the slidable element 280 and the elastic element 290 can be directly installed in the corresponding pressing rod 261 (or the pressing rod 271). Since it is not necessary to largely change the specifications or structures of other cooperative components of the mouse device 200, the mass production cost of the mouse device 200 is reduced. Moreover, the slidable element 280 is fixed in the perforation 266 of the sleeve 263 (or the perforation 276 of the sleeve 272) through the hook 282. In case that the slidable element 280 (or the elastic element 290) needs to be replaced with a new one in a different specification, the user can pull the hook 282 outwardly to eject the slidable element 280 from the perforation 266 of the sleeve 263 (or the perforation 276 of the sleeve 272). Consequently, the convenience of maintaining or replacing components will be enhanced.

While the slidable element 280 is moved around the sleeve 263 of the pressing rod 261 (or the sleeve 272 of the pressing rod 271), a friction force is generated, and powdery material is possibly generated. For avoiding the generation of the powdery material, the slidable element 280 is made of the material with high lubricity and high wear resistance. For example, the material of the slidable element 280 is selected from at least one of acrylonitrile butadiene styrene (ABS), polycarbonate (PC), polyoxymethylene (POM) and polytetrafluoroethylene (PTFE).

In an embodiment, the mouse device 200 further comprises at least one buffering pad 284. The buffering pad 284 is attached on an external surface of the corresponding sleeve 281, or the buffering pad 284 is arranged between the corresponding sleeve 281 and the triggering part 231 of the corresponding switch 230. The arrangement of the buffering pad 284 can increase the capability of withstanding abrasion and extend the use life of the mouse device 200. In addition, the arrangement of the buffering pad 284 can maintain the tiny interference between the corresponding sleeve 281 and the triggering part 231 of the corresponding switch 230. For example, the material of the buffering pad 284 is selected from at least one of polytetrafluoroethylene (PTFE) and ultra-high molecular weight polyethylene (UPE).

As mentioned above, the special material of the slidable element 280 and the arrangement of the buffering pad 284 can reduce the influence of the friction force. Furthermore, the structure of the mouse device 200 is specially designed to reduce the friction force when the slidable element 280 is moved around the sleeve 263 of the pressing rod 261 (or the sleeve 272 of the pressing rod 271), and thus the jammed problem is effectively avoided. Hereinafter, some examples of the structural improvements of the mouse device to reduce the friction force and avoid the jammed problem will be described as follows.

Figure 16A:
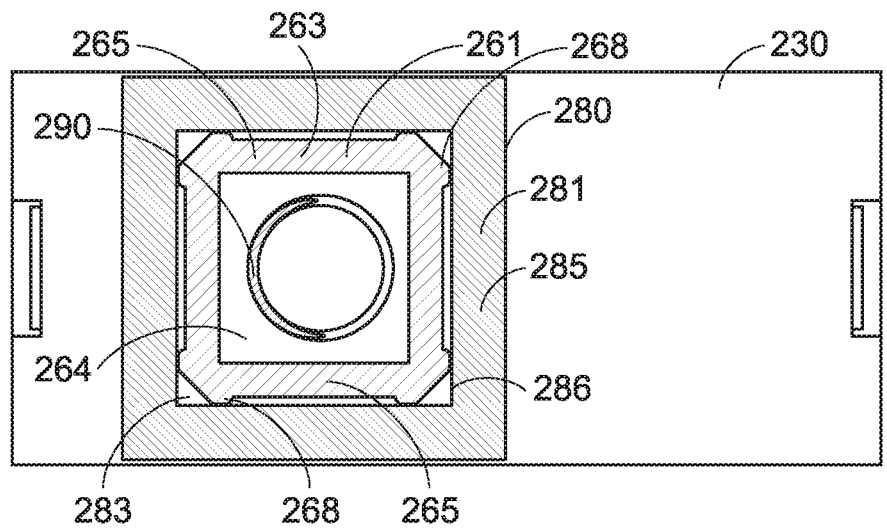
FIG. 16A is a schematic cross-sectional view illustrating of the sleeve of the pressing rod and the sleeve of the slidable element of the mouse device as shown in FIG. 12 and taken along the line 16A-16A.

FIG. 16A is a schematic cross-sectional view illustrating of the sleeve of the pressing rod and the sleeve of the slidable element of the mouse device as shown in FIG. 12 and taken along the line 16A-16A. As shown in FIG. 16A, two protrusion edge structures 268 and 277 are formed on a lateral wall 265 of the sleeve 263 of the pressing rod 261 and a lateral wall 274 of the sleeve 272 of the pressing rod 271, respectively. The protrusion edge structures 268 and 277 are contacted with inner walls 286 of the slidable elements 280, respectively. Consequently, the sleeve 263 of the pressing rod 261 and the sleeve 272 of the pressing rod 271 are contacted with inner walls 286 of the corresponding slidable elements 280 in a line contact manner instead of the surface contact manner. Consequently, the friction force therebetween is reduced. In other words, while the sleeve 263 of the pressing rod 261 (or the sleeve 272 of the pressing rod 271) is moved within the sleeve 281 of the corresponding slidable element 280, the jammed problem is avoided.

Figure 16B:
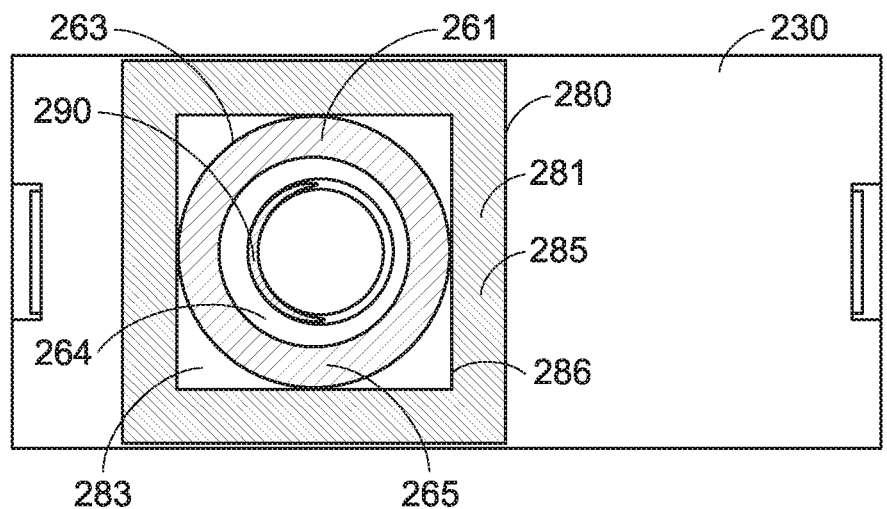
FIG. 16B is a schematic cross-sectional view illustrating of the sleeve of the pressing rod and the sleeve of the slidable element in a variant example of the mouse device as shown in FIG. 16A.

In a variant example, the shape of the lateral wall 265 of the sleeve 263 of the pressing rod 261 (or the lateral wall 274 of the sleeve 272 of the pressing rod 271) is changed. FIG. 16B is a schematic cross-sectional view illustrating of the sleeve of the pressing rod and the sleeve of the slidable element in a variant example of the mouse device as shown in FIG. 16A. As shown in FIG. 16B, the lateral wall 265 of the sleeve 263 of the pressing rod 261 (or the lateral wall 274 of the sleeve 272 of the pressing rod 271) has a cylindrical profile. Consequently, the lateral wall 265 of the sleeve 263 of the pressing rod 261 (or the lateral wall 274 of the sleeve 272 of the pressing rod 271) is contacted with the inner wall 286 of the corresponding slidable element 280 in the line contact manner.

Figure 16C:
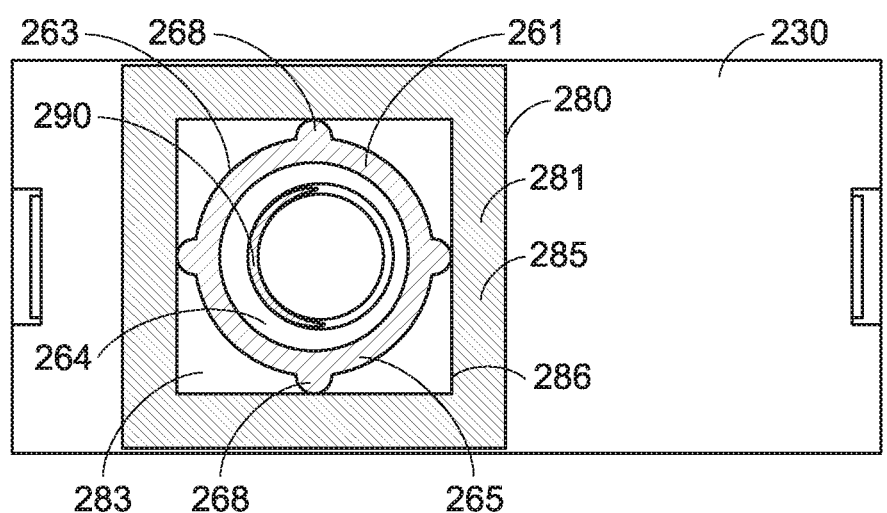
FIG. 16C is a schematic cross-sectional view illustrating of the sleeve of the pressing rod and the sleeve of the slidable element in another variant example of the mouse device as shown in FIG. 16A.

FIG. 16C is a schematic cross-sectional view illustrating of the sleeve of the pressing rod and the sleeve of the slidable element in another variant example of the mouse device as shown in FIG. 16A. As shown in FIG. 16C, the lateral wall 265 of the sleeve 263 of the pressing rod 261 (or the lateral wall 274 of the sleeve 272 of the pressing rod 271) also has a cylindrical profile. In addition, the pressing rod 261 and the pressing rod 271 are equipped with the protrusion edge structures 268 and 277, respectively. Consequently, the friction force therebetween is reduced. In this way, while the sleeve 263 of the pressing rod 261 (or the sleeve 272 of the pressing rod 271) is moved within the sleeve 281 of the corresponding slidable element 280, the jammed problem is avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
   a middle frame comprising an opening part and a first hook, wherein the first hook is located beside the opening part;
   a switch fixed at a position under the middle frame, wherein the switch comprises a triggering part;
   a button plate located over the middle frame, and comprising a pressing rod, wherein the pressing rod is penetrated downwardly through the opening part of the middle frame, and the pressing rod comprises a receiving groove and a first sleeve, wherein the receiving groove is located over the first sleeve, and the first sleeve comprises a perforation;
   a slidable element comprising a second sleeve and a second hook, wherein the second sleeve is installed within the first sleeve, and the second hook is engaged with the perforation; and
   an elastic element, wherein the elastic element is disposed within the second sleeve, so that the receiving groove is upwardly pushed against the first hook and the second sleeve is downwardly pushed against the triggering part of the switch.

2. The mouse device according to claim 1, wherein the slidable element is made of a material with high lubricity and high wear resistance.

3. The mouse device according to claim 1, wherein a material of the slidable element is selected from at least one of acrylonitrile butadiene styrene (ABS), polycarbonate (PC), polyoxymethylene (POM) and polytetrafluoroethylene (PTFE).

4. The mouse device according to claim 1, wherein the mouse device further comprises a buffering pad, which is arranged between the second sleeve and the triggering part of the switch, wherein a material of the buffering pad is selected from at least one of polytetrafluoroethylene (PTFE) and ultra-high molecular weight polyethylene (UPE).

5. The mouse device according to claim 1, wherein a protrusion edge structure is formed on a lateral wall of the second sleeve, and the protrusion edge structure is contacted with an inner wall of the first sleeve.

6. The mouse device according to claim 1, wherein the second sleeve and the first sleeve are contacted with each other in a line contact manner.

7. The mouse device according to claim 1, wherein a length of the perforation is larger than a length of the second hook.

8. A mouse device, comprising:
   a middle frame comprising an opening part and a first hook, wherein the first hook is located beside the opening part;
   a switch fixed at a position under the middle frame, wherein the switch comprises a triggering part;
   a button plate located over the middle frame, and comprising a pressing rod, wherein the pressing rod is penetrated downwardly through the opening part of the middle frame, and the pressing rod comprises a receiving groove and a first sleeve, wherein the receiving groove is located over the first sleeve, and the first sleeve comprises a perforation;
   a slidable element comprising a second sleeve and a second hook, wherein the first sleeve is installed within the second sleeve, and the second hook is engaged with the perforation; and
   an elastic element, wherein the elastic element is disposed within the first sleeve, so that the receiving groove is upwardly pushed against the first hook and the second sleeve is downwardly pushed against the triggering part of the switch.

9. The mouse device according to claim 8, wherein the slidable element is made of a material with high lubricity and high wear resistance.

10. The mouse device according to claim 8, wherein a material of the slidable element is selected from at least one of acrylonitrile butadiene styrene (ABS), polycarbonate (PC), polyoxymethylene (POM) and polytetrafluoroethylene (PTFE).

11. The mouse device according to claim 8, wherein the mouse device further comprises a buffering pad, which is arranged between the second sleeve and the triggering part of the switch, wherein a material of the buffering pad is selected from at least one of polytetrafluoroethylene (PTFE) and ultra-high molecular weight polyethylene (UPE).

12. The mouse device according to claim 8, wherein a protrusion edge structure is formed on a lateral wall of the first sleeve, and the protrusion edge structure is contacted with an inner wall of the second sleeve.

13. The mouse device according to claim 8, wherein the first sleeve and the second sleeve are contacted with each other in a line contact manner.

* * * * *